(12) United States Patent
Shi et al.

(10) Patent No.: US 8,624,451 B2
(45) Date of Patent: Jan. 7, 2014

(54) PERMANENT-MAGNET SYNCHRONOUS MOTOR OF DRAINAGE PUMP

(75) Inventors: Huashan Shi, Jiangmen (CN); Yuyang Ma, Jiangmen (CN)

(73) Assignee: Jiangmen Idear Hanyu Electrical Joint-Stock Co., Ltd., Jiangmen, Guangdong Province (CN)

( * ) Notice: Subject to any disclaimer, the term of this patent is extended or adjusted under 35 U.S.C. 154(b) by 0 days.

(21) Appl. No.: 12/638,306

(22) Filed: Dec. 15, 2009

(65) Prior Publication Data

US 2010/0090548 A1 Apr. 15, 2010

Related U.S. Application Data

(63) Continuation of application No. PCT/CN2008/000388, filed on Feb. 22, 2008.

(30) Foreign Application Priority Data

Aug. 8, 2007 (CN) .......................... 2007 1 0143209

(51) Int. Cl.
*H02K 1/04* (2006.01)
(52) U.S. Cl.
USPC .................................. 310/43; 29/596; 29/598
(58) Field of Classification Search
USPC ............. 310/43–45; 29/596–598; 174/110 R; 336/90, 192
See application file for complete search history.

(56) References Cited

U.S. PATENT DOCUMENTS 3,842,487 A * 10/1974 Hartz ............................. 228/116
4,129,744 A * 12/1978 Cunningham et al. ...... 174/94 R
5,767,606 A * 6/1998 Bresolin ................. 310/216.038
6,012,217 A * 1/2000 Kliman et al. ................... 29/596
6,081,056 A * 6/2000 Takagi et al. ..................... 310/89
6,326,879 B1 * 12/2001 Hangmann et al. ........... 337/381

(Continued)

FOREIGN PATENT DOCUMENTS

CN 2901520 Y * 5/2007 ............. H02K 11/00
EP 1137155 A2 * 9/2001 ............. H02K 11/00

(Continued)

OTHER PUBLICATIONS

JP2003062664 machine translation on Nov. 29, 2011.*
JP2003062664 A machine translation Nov. 16, 2012.*

*Primary Examiner* — Tran Nguyen
*Assistant Examiner* — Leda Pham
(74) *Attorney, Agent, or Firm* — Boyle Fredrickson, S.C.

(57) ABSTRACT

A permanent-magnet synchronous motor of a draining pump is disclosed. It includes a permanent-magnet rotor for driving an impeller to rotate, a pump body for supporting the permanent-magnet rotor, a stator core and a stator coil. Among which, the stator coil is constructed with an enamelled aluminum wire winding which is coiled by an enamelled aluminum wire and sealed in a container. The invention applies the enamelled aluminum wire to the permanent-magnet synchronous motor of a draining pump. The winding of the stator coil and a welding part of its lead-out wire are sealed with plastic or epoxy resin which effectively isolate them from outside air, especially damp air. Therefore, the invention prevent the enamelled aluminum wire winding of the stator coil and the welding part of its lead-out wire from being oxidized in air and being corroded by the moisture, acid or alkaline matter in damp air.

13 Claims, 2 Drawing Sheets

(56) References Cited

U.S. PATENT DOCUMENTS

| | | | |
|---|---|---|---|
| 7,038,570 B2 * | 5/2006 | McMichael et al. | 337/380 |
| 2002/0047332 A1 * | 4/2002 | Ooiwa | 310/45 |
| 2006/0113849 A1 * | 6/2006 | Enomoto et al. | 310/44 |

FOREIGN PATENT DOCUMENTS

| | | | | |
|---|---|---|---|---|
| JP | 2003062664 | * | 3/2003 | |
| JP | 2003062664 A | * | 3/2003 | B23K 1/00 |
| JP | 2005108608 A | * | 4/2005 | |

* cited by examiner

PERMANENT-MAGNET SYNCHRONOUS MOTOR OF DRAINAGE PUMP

CROSS-REFERENCE TO RELATED APPLICATIONS

This application is a continuation of, and claims priority to, International Application PCT/CN2008/000388 which was assigned an international filing date of Feb. 22, 2008 and associated with publication WO 2009/018707 and which claims priority to Chinese Application 200710143209.3 filed on Aug. 8, 2007, the disclosures of which are expressly incorporated herein.

FIELD OF THE INVENTION

The present invention relates to a permanent-magnet synchronous motor of draining pump, in particular to a permanent-magnet synchronous motor of a draining pump in which an enameled aluminum wire is applied to a stator coil.

BACKGROUND OF THE PRESENT DISCLOSURE

Research for use of an enameled aluminum wire to a motor started in the 1970s in China. The enameled aluminum wire, in particular to its welding point or part, is inclined to be oxidized when it meets oxygen in air. In addition, the enameled aluminum wire and its welding point are corroded readily by acid and alkaline matter in moist air. Since the enameled aluminum wire, especially one with diameter less than 0.03937 inches or 1 mm, lacking the ability to resist oxidization and corrosion, there is always a technical barrier for applying it on the motor. Up to now, no practical application for enameled aluminum wire to permanent-magnet synchronous motor of draining pump is presented.

SUMMARY OF THE PRESENT INVENTION

The present invention provides a permanent-magnet synchronous motor of a draining pump which has ability to prevent its enameled aluminum wire winding and a welding point of the winding from oxidization and corrosion.

The permanent-magnet synchronous motor of draining pump comprises a permanent-magnet rotor for driving an impeller to rotate, a pump body for supporting the permanent-magnet rotor, a stator core and a stator coil, in which the stator coil has an enameled aluminum wire winding which is constructed by coiling an enameled aluminum wire. The enameled aluminum wire winding is sealed in a container.

Since the enameled aluminum wire winding of the invention is sealed in the container so as to be isolated from air, in particular acidic and alkaline mist in the moist environment, it prevents the enameled aluminum wire winding from being oxidized and corroded.

In particular, a welding part of a lead-out wire for the enameled aluminum wire winding is covered or coated with insulating material which isolate it from the outside, so that the present invention brings a technical effect of avoiding the welding part being oxidized and corroded.

Wherein, the container for sealing and packaging the enameled aluminum wire is a plastic-seal plastic container or an epoxy resin container. It not only has improved sealing effect, but also is easier to be produced and manufactured.

In one embodiment, the plastic-seal plastic container takes the shape of coil bobbin of the enameled aluminum wire. In another embodiment, the epoxy resin container is formed by pouring epoxy resin onto the enameled aluminum wire placed in a cavity body and solidifying it.

Wherein, the enameled aluminum wire and the welding part of its lead-out wire are insulated or isolated from the outside by the way of covering and sealing them with epoxy resin being poured onto them.

During implementing sealing operation, the outside surface of the enameled aluminum wire winding may be firstly covered by insulating paper tape, and then sealed by plastic or epoxy resin.

In the invention, the welding part of the lead-out wire for the enameled aluminum wire winding is treated on its surface with tin plating or tin immersion.

The diameter of the enameled aluminum wire is less than or equal to 0.03937 inches or 1.0 mm and the thickness of the stator core is between 0.03937 inches or 10 mm and 1.9685 inches or 50 mm.

The invention has the technical effects as below:

Since the winding of the stator coil, especially its lead-out wire welding part, is sealed with plastic or epoxy resin, it is isolated from acidic and alkaline mist in a humid environment. It effectively prevent the winding of the stator coil from being corroded and prevent a welding point of the aluminum wire, which is generally welded with a copper terminal, from conducting oxidation reaction of copper and aluminum by the influence of oxygen in air.

The winding of the stator coil is sealed with plastic. Plastic keep it and the coil lead-out wire of it separate from the outside which effectively prevents them from being corroded by salty mist.

Such a configuration of the invention allows it to be quickly and efficiently produced in mass or batches with low cost and reliable quality.

The following is the detailed description of the invention in combination with the drawings.

DETAILED DESCRIPTION

Figure 1:
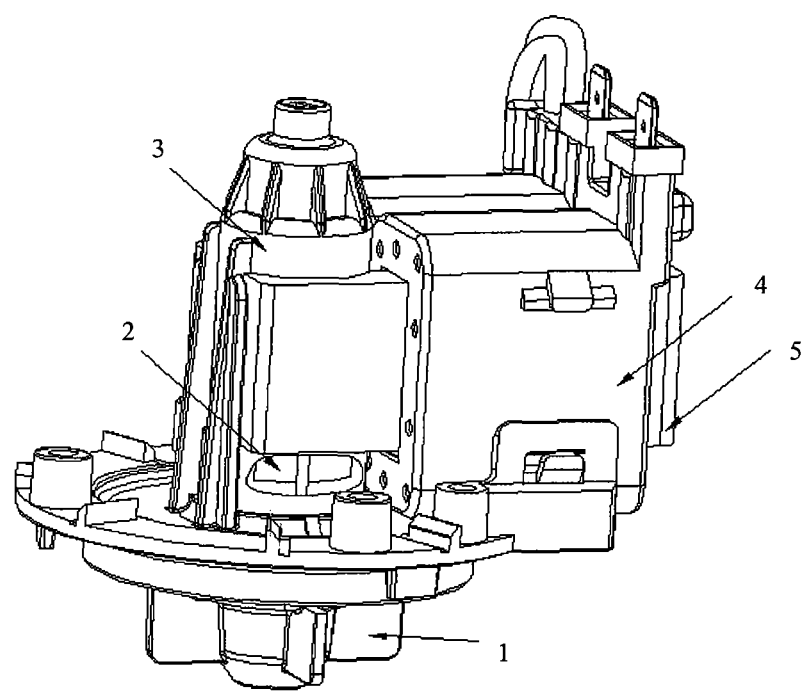
FIG. 1 is an overall structural view of a permanent-magnet synchronous motor of a draining pump according to the present invention.

FIG. 1 illustrates the overall structure for the permanent-magnet synchronous motor of a draining pump. As shown in FIG. 1, the permanent-magnet synchronous motor of a draining pump according to the present invention includes a permanent-magnet rotor 2 for driving an impeller to rotate, a pump body 3 for supporting the permanent-magnet rotor, a stator core 5 and a stator coil 4. Wherein, the stator coil 4 has an enameled aluminum wire winding which is constructed by coiling an enameled aluminum wire 7 and is sealed in a container 10.

In particular, the outside surface of a welding part 9 of a lead-out wire for the enameled aluminum wire winding (see FIG. 2) is covered or coated with insulating materials which isolates it from the outside. Therefore it avoids effectively the welding part being oxidized and corroded. The insulating materials include insulating glue, insulating varnish, epoxy resin and so on.

FIG. 1 also illustrates a draining pump applied to the present invention. The draining pump can drain off water by means of rotation of an impeller 1 which is driven by the permanent-magnet rotor 2 of the permanent-magnet synchronous motor. The permanent-magnet rotor 2 is supported by the pump body 3. The stator coil 4 is arranged on the stator core 5 which is fixed on the pump body 3. When the current flows through the stator coil 4, the permanent-magnet rotor 2 rotates to drive the impeller 1 for draining off water.

Figure 2:
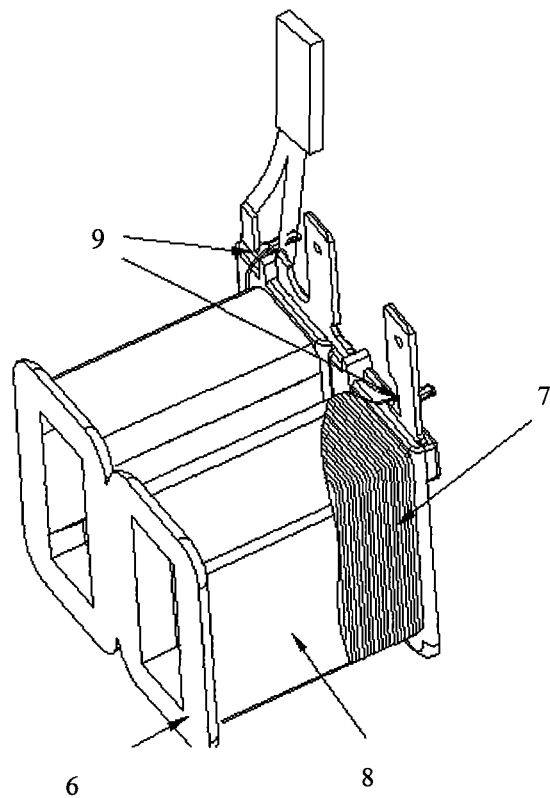
FIG. 2 is a schematic view of the stator coil which is not sealed with plastic according to the present invention.

FIG. 2 shows the stator coil 4 which is not sealed. As shown in FIG. 2, the enameled aluminum wire winding is formed by winding or coiling the enameled aluminum wire 7 around the coil bobbin 6. Before the stator coil 4 is sealed, the outside surface of the enameled aluminum wire winding is covered with one layer or layers of insulating paper tape 8.

In addition, before the stator coil 4 is sealed, the outside surface for the welding part of the lead-out wire of the enameled aluminum wire is subject to insulating treatment. For example, the welding part of the lead-out wire of the enameled aluminum wire is coated with insulating substance such as insulating varnish and so on, so that it is insulated from the outside. The welding part of the lead-out wire 9 of the enameled aluminum wire winding is the one that is welded, and suffers surface treatment with tinning or tin immersion.

Figure 3:
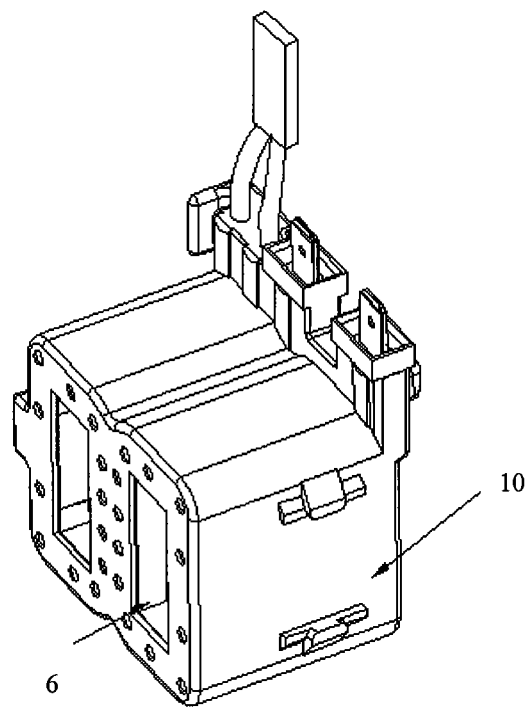
FIG. 3 is a schematic view of the stator coil which is sealed with plastic according to the present invention.

FIG. 3 shows the stator coil which is sealed. The enameled aluminum wire 7 wound on the coil bobbin 6 is sealed in the container 10 after it is covered with the insulating paper 8. The container 10 can be a plastic-encapsulation container and it takes the shape of the coil bobbin 6 wound with the enameled aluminum wire 7. In other words, the plastic-encapsulation container is formed by sealing and packaging the coil bobbin 6 wound with the enameled aluminum wire 7 with plastic.

In addition, the welding part 9 of the lead-out wire for the enameled aluminum wire winding is also sealed in the container 10.

Figure 4:
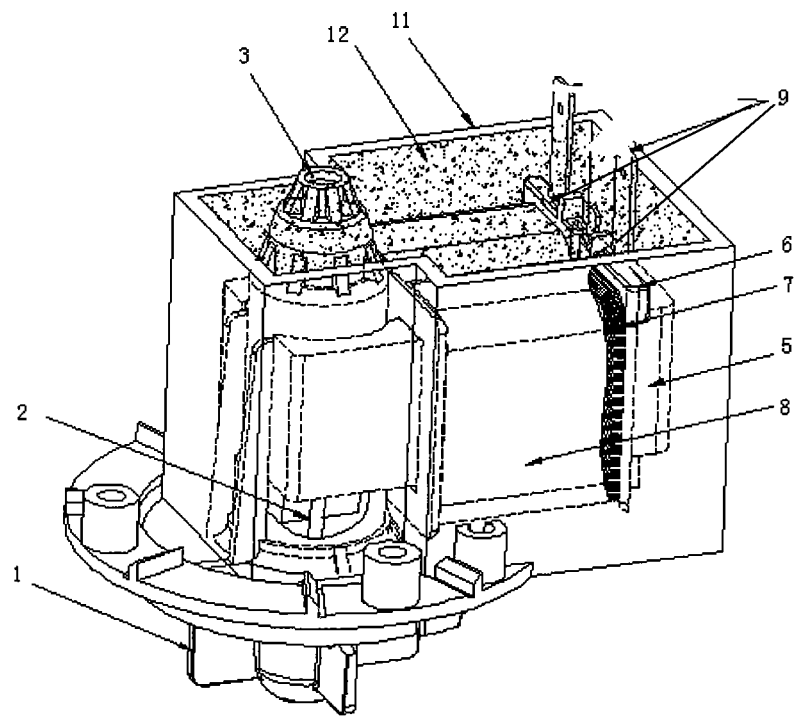
FIG. 4 is a schematic view of the stator coil which is sealed with epoxy resin according to the present invention.

FIG. 4 shows the stator coil which is sealed with epoxy resin. The stator coil 4 wound with the enameled aluminum wire is first placed into a pump body having annular thin-wall cavity and then it is poured with epoxy resin. The enameled aluminum wire winding, especially its welding point of the lead-out wire, is coated and sealed with epoxy resin.

In the invention, the diameter of the enameled aluminum wire 7 is less than or equal to 0.03937 inches or 1.0 mm and the thickness of the stator core 5 is between 0.03937 inches or 10 mm and 1.9685 inches or 50 mm.

The invention has technical effects as below:

Since the stator coil winding, especially its lead-out wire welding part, is sealed with plastic or epoxy resin, it is isolated from acidic and alkaline mist in a humid environment. It effectively prevents the stator coil winding from being corroded and the aluminum wire welding point, which is generally welded with copper terminal, from occurring oxidation reaction of copper and aluminum under the action of oxygen in air.

The stator coil is sealed with plastic and plastic can separate the stator coil winding and the coil lead-out wire isolated from the outside, which effectively prevents the stator coil winding from being corroded by salt mist.

What is claimed is:

1. A permanent-magnet synchronous motor of a draining pump which runs in a primarily gaseous atmosphere environment, comprising:
a permanent-magnet rotor for driving an impeller to rotate,
a pump body for supporting the permanent-magnet rotor, a stator assembly including a stator core and a stator coil, wherein
the stator coil is equipped with an enameled aluminum wire winding which is constructed by coiling an enameled aluminum wire, wherein only the enameled aluminum wire winding of the stator assembly is sealed in a container in order to prevent the enameled aluminum wire from being oxidized when it meets oxygen in air of the primarily gaseous atmosphere;
an outside surface of a welding part of a lead-out wire with enamel for the enameled aluminum wire winding is treated by tinning or tin immersion;
the welding part of the lead-out wire enamel of the enameled aluminum wire winding being treated by tinning or tin immersion is welded to a copper terminal with tin; and
the outside surface of the enameled aluminum wire winding is covered with an insulating paper tape, and is then sealed with the container which is formed by one of plastic or epoxy resin.

2. The permanent-magnet synchronous motor of a draining pump according to claim 1, wherein one of the tinning or the tin immersion of the welding part of the lead-out wire for the enameled aluminum wire winding isolates the lead-out wire from atmosphere.

3. The permanent-magnet synchronous motor of a draining pump according to claim 1, wherein the container is formed by plastic that takes shape of a coil bobbin which is coiled by the enameled aluminum wire.

4. The permanent-magnet synchronous motor of a draining pump according to claim 1, wherein the container is formed by epoxy resin that is constructed by pouring epoxy resin onto the enameled aluminum wire winding which is arranged in a cavity body and solidifying it.

5. The permanent-magnet synchronous motor of a draining pump according to claim 1, wherein the enameled aluminum wire winding and the welding part are covered and sealed by epoxy resin.

6. The permanent-magnet synchronous motor of a draining pump according to claim 1, wherein the diameter of the enameled aluminum wire is smaller or equal to 0.03937 inches (1.0 mm).

7. The permanent-magnet synchronous motor of draining pump according to claim 1, wherein the thickness of the stator core is between 0.3937 inches (10 mm) and 1.9685 inches (50 mm).

8. A permanent-magnet synchronous motor of a draining pump which runs in a primarily gaseous atmosphere environment, comprising:
a permanent-magnet rotor for driving an impeller to rotate;
a pump body for supporting the permanent-magnet rotor;
a stator assembly including a stator core and a stator coil;
wherein the stator coil is equipped with an enameled aluminum wire winding which is constructed by coiling an enameled aluminum wire;
only the enameled aluminum wire winding of the stator assembly is sealed in a container in order to prevent the enameled aluminum wire from being oxidized when it meets oxygen in air of the primarily gaseous atmosphere;
an outside surface of a welding part of a lead-out wire with enamel for the enameled aluminum wire winding is treated by tinning or tin immersion;
the welding part of the lead-out wire with enamel for the aluminum wire winding being treated by tinning or tin immersion is welded to a copper terminal with tin; and
the outside surface of the welding part of the lead-out wire with enamel for the enameled aluminum wire winding is covered or coated with insulating materials which isolates it from the outside; and the outside surface of the enameled aluminum wire winding is covered with an insulating paper tape, and then is sealed in the container which is formed by one of plastic or epoxy resin.

9. The permanent-magnet synchronous motor of a draining pump according to claim 8, wherein the container is formed by plastic and takes shape of a coil bobbin which is coiled by the enameled aluminum wire.

10. The permanent-magnet synchronous motor of a draining pump according to claim 8, wherein the container is formed by epoxy resin and is constructed by pouring epoxy resin onto the enameled aluminum wire winding which is arranged in a cavity body and solidifying it.

11. The permanent-magnet synchronous motor of a draining pump according to claim 10, wherein the enameled aluminum wire winding and the welding part of its lead-out wire are covered and sealed by epoxy resin.

12. The permanent-magnet synchronous motor of a draining pump according to claim 8, wherein the diameter of the enameled aluminum wire is smaller or equal to 0.03937 inches (1.0 mm).

13. The permanent-magnet synchronous motor of a draining pump according to claim 8, wherein the thickness of the stator core is between 0.3937 inches (10 mm) and 1.9685 inches (50 mm).

* * * * *